US008069781B2

(12) United States Patent
Lang

(10) Patent No.: US 8,069,781 B2
(45) Date of Patent: Dec. 6, 2011

(54) AGRICULTURAL BALER

(75) Inventor: Eric Ryan Lang, Ottumwa, IA (US)

(73) Assignee: Deere & Company, Moline, IL (US)

( * ) Notice: Subject to any disclaimer, the term of this patent is extended or adjusted under 35 U.S.C. 154(b) by 279 days.

(21) Appl. No.: 12/262,280

(22) Filed: Oct. 31, 2008

(65) Prior Publication Data

US 2010/0107588 A1   May 6, 2010

(51) Int. Cl.
*B30B 9/30* (2006.01)
*B30B 1/06* (2006.01)

(52) U.S. Cl. .......................... 100/189; 100/245; 100/295

(58) Field of Classification Search ............... 100/98 R, 100/178, 179, 240, 245, 281, 282, 283, 295, 100/189; 56/341
See application file for complete search history.

(56) References Cited

U.S. PATENT DOCUMENTS

| | | | | |
|---|---|---|---|---|
| 705,134 A | * | 7/1902 | Pope et al. | 100/3 |
| 789,045 A | * | 5/1905 | Mercer | 100/179 |
| 3,063,363 A | * | 11/1962 | Lamb | 100/295 |
| 4,569,282 A | * | 2/1986 | Galant | 100/189 |
| 4,829,756 A | * | 5/1989 | Schrag et al. | 56/341 |
| 4,945,719 A | * | 8/1990 | Schrag et al. | 56/341 |
| 5,301,607 A | * | 4/1994 | Stromer et al. | 100/98 A |

FOREIGN PATENT DOCUMENTS

| | | |
|---|---|---|
| DE | 384153 | 11/1923 |
| DE | 1119584 | 12/1961 |
| DE | 1181969 | 11/1964 |
| DE | 1184543 | 12/1964 |
| DE | 3317680 | 6/1984 |
| DE | 3519356 | 12/1985 |
| FR | 2143033 | 2/1973 |
| GB | 2145968 | 4/1985 |
| SU | 1037880 | 8/1983 |
| SU | 1066496 | 1/1984 |
| SU | 1187754 | 10/1985 |

OTHER PUBLICATIONS

European Search Report, Mar. 29, 2010.

* cited by examiner

*Primary Examiner* — Jimmy T Nguyen

(57) ABSTRACT

An agricultural baling machine that includes a rotating element, a plunger, a guiding channel and a linking element. The plunger has a pivoting point. The pivoting point travels in the guiding channel. The guiding channel defines the longitudinal axis. The linking element is connected between the rotating element and the plunger. The plunger has a face configured to have a line of loading. The line of loading is generally normal to the longitudinal axis. The line of loading shifts across the face as the linking element drives the plunger generally in a direction corresponding to the longitudinal axis.

18 Claims, 3 Drawing Sheets

AGRICULTURAL BALER

FIELD OF THE INVENTION

The present invention relates to an agricultural baler, and, more particularly, to a plunger system of an agriculture baler.

BACKGROUND OF THE INVENTION

A plunger type hay baler includes a frame that is hitched to a tractor and is configured to receive crop material, such as hay or straw, into a pressing cavity in which the crop material is pressed and formed into a bale. The baler includes a loading mechanism in which the crop material is collected from the ground, which is then routed into the pressing channel in a manner that is synchronous with a plunger. The plunger moves in a reciprocating manner in the pressing channel and encounters each new flake of crop material that is moved into the channel for compacting into a bale. After a sufficient amount of crop material has been compressed in the pressing channel, a twine threading mechanism inserts twine through a portion of the compressed material and the twine is then tied to complete the binding of the bale. The bale then proceeds further through the pressing channel and is ejected from the baling machine.

A traditional baling system utilizes a plunger that slides in the pressing channel with the plunger riding along and being constrained by the pressing channel itself. The force exerted against the crop material on this type of plunger arrangement is directly normal to the face of the plunger, thereby causing all of the resistance to be directly reflected onto the plunger as it moves.

What is needed in the art is a simple plunger arrangement that avoids having the face of the plunger encountering a load that is completely normal to the face.

SUMMARY OF THE INVENTION

The present invention relates to a plunger type baler system.

The invention in one form is directed to an agricultural baling machine including a structural element, a rotating element, a plunger and a linking element. The structural element has a crop receiving channel that defines a longitudinal axis therein. The linking element is connected between the rotating element and the plunger. The plunger has a face configured to have a line of loading. The line of loading is generally normal to the longitudinal axis. The line of loading shifts across the face as the linking element drives the plunger generally in a direction corresponding to the longitudinal axis.

The invention in another form is directed to an agricultural baling machine including a rotating element, a plunger, a guiding channel and a linking element. The plunger has a pivoting point. The pivoting point travels in the guiding channel. The guiding channel defines the longitudinal axis. The linking element is connected between the rotating element and the plunger. The plunger has a face configured to have a line of loading. The line of loading is generally normal to the longitudinal axis. The line of loading shifts across the face as the linking element drives the plunger generally in a direction corresponding to the longitudinal axis.

DETAILED DESCRIPTION OF THE INVENTION

Figure 1:
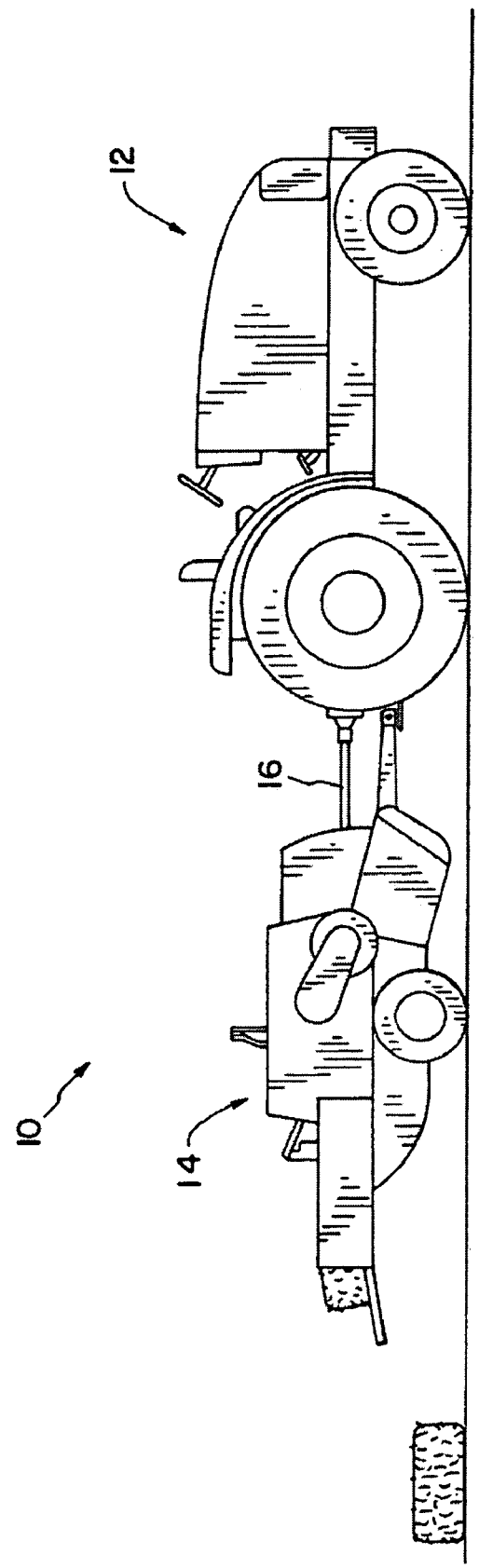
FIG. 1 is a side view of a tractor and baler system utilizing an embodiment of the plunger of the present invention.

Referring now to the drawings, and, more particularly to FIG. 1, there is shown an agricultural baling apparatus 10 including a tractor 12 and a baler 14 that is driven by a power take off (PTO) shaft 16 connected therebetween. Baler 14 is a plunger type baler that utilizes a plunger of the present invention.

Figure 2:
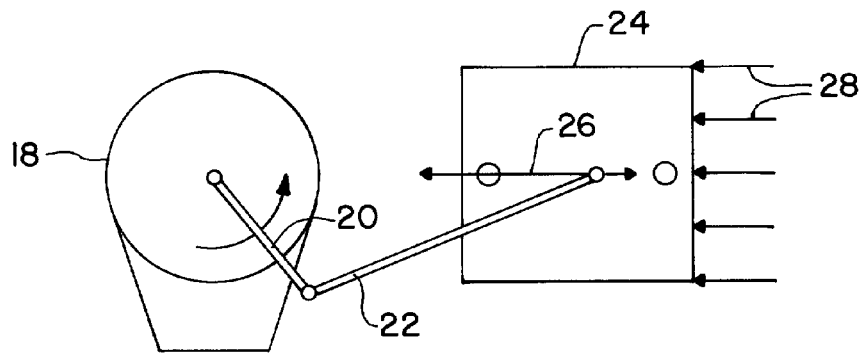
FIG. 2 is a schematical representation for a prior art plunger baler system.

Now, additionally referring to FIG. 2, there is shown in a schematic form a prior art baling system including a rotating component 18, a rotary arm 20, a linking member 22, and a plunger 24. Rotating component 18 is fixed to rotary arm 20 causing rotary arm 20 to rotate in a counterclockwise direction as illustrated in FIG. 2. Movement of rotary arm 20 causes linking member 22, which is pivotally attached to rotary arm 20, to cause plunger 24 to move in a reciprocating manner along direction 26. Linking member 22 is pivotally connected to both plunger 24 and rotary arm 20. The crop material exerts a perpendicular force to the face of plunger 24, the force being denoted as force elements 28. Plunger 24 moves in a reciprocating manner based upon the interaction of rotary arm 20 with linking member 22 causing the entire face of plunger 24 to move in a sinusoidal manner as rotary arm 20 rotates.

Figure 3:
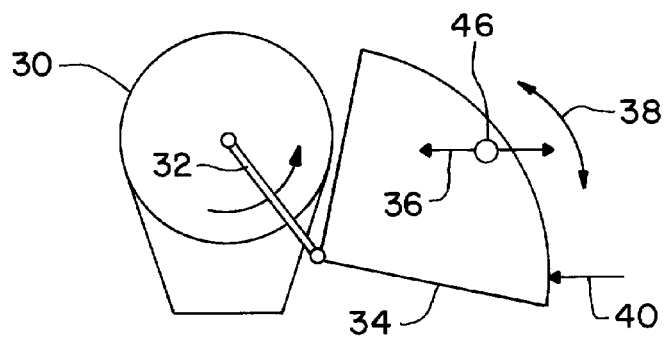
FIG. 3 is a schematical view of the plunger of FIG. 1.

Now, additionally referring to FIG. 3, there is shown in a schematic form an embodiment of a plunger system of the present invention having a rotating component 30, a rotary arm 32, and a plunger 34. Rotary arm 32 directly drives plunger 34 without an intervening pivoting linking member such as linking member 22, pivoting pivot point 46 of plunger 34 is constrained to move in a longitudinal direction 36 causing the face of plunger 34 to rotate in direction 38 as rotary arm 32 causes plunger 34 to move in longitudinal direction 36. The line of force along the face of plunger 34 is only normal to the crop material along a particular line of force, schematically shown here as line 40. This line of force 40 exists as a line across the face of plunger 34, the line representing the place where the force against the face is parallel to the direction of movement 36. This line of force 40 moves along the face of plunger 34 as the face rotates in direction 38.

Now, additionally referring to FIGS. 4-7, there are illustrated elements of plunger 34 of the present invention at different positions along its travel in a crop receiving channel also known as a pressing channel 42. Along the side of pressing channel 42 are guiding channels 44 that interact with pivot point 46 of plunger 34. Linking element 48 is rigidly attached to plunger 34 and may be considered a part of plunger 34 that extends out and connects with rotary arm 32. Unlike the prior art, shown in FIG. 2, linking element 48 is not pivotally attached to plunger 34. Specifically, there is no pivotal attachment for linking element 48 to plunger 34. Plunger 34 has a convex shaped face 50 that is directed towards the crop material.

Pressing channel 42 as well as guiding channels 44 define a longitudinal axis 52 that coincides with the travel of pivot point 46. Although guiding channel 44 is only shown on one side of pressing channel 42, it is understood that a guiding channel 44 exists on each side of pressing channel 42. Crop material enters pressing channel 42 in front of (to the left of) knife 54. Knife 54 has a sharp edge that cuts the crop material that has partially entered pressing channel 42 as plunger 34 approaches knife 54 and moves past it.

Figure 4:
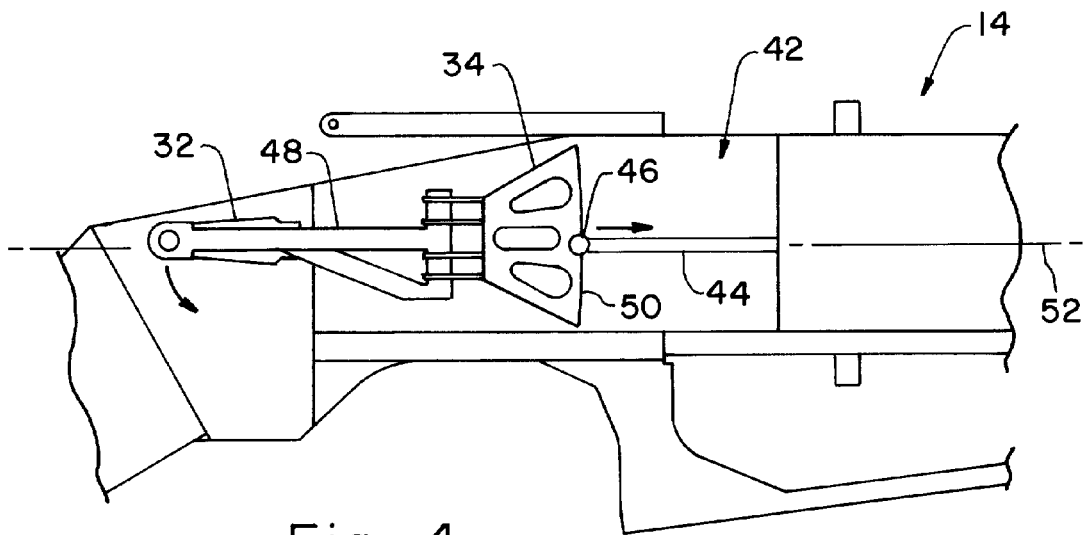
FIG. 4 is a schematical side view of the plunger of FIGS. 1 and 3 in the fully retracted position.
Figure 5:
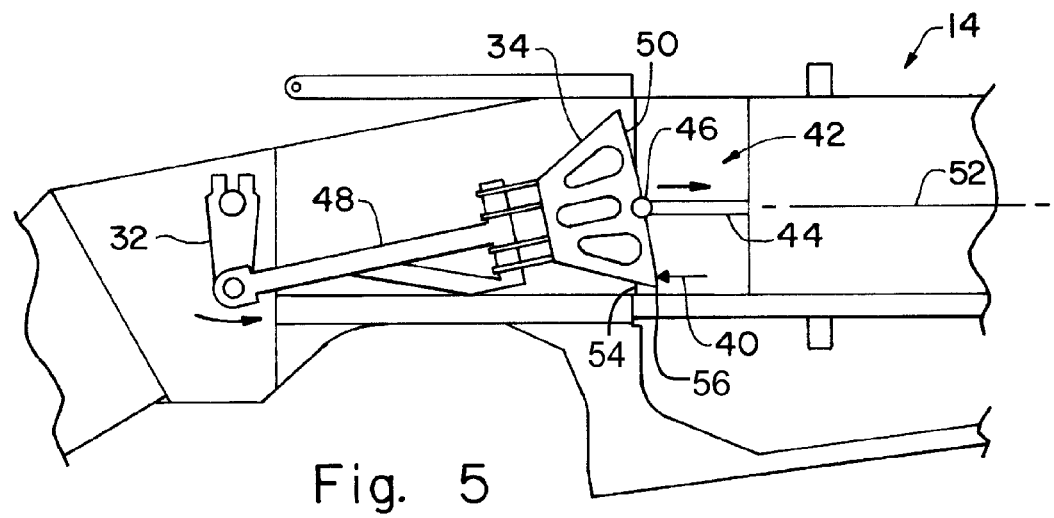
FIG. 5 is a schematical side view of the plunger of FIGS. 1, 3 and 4 in a partially compressed position.
Figure 6:
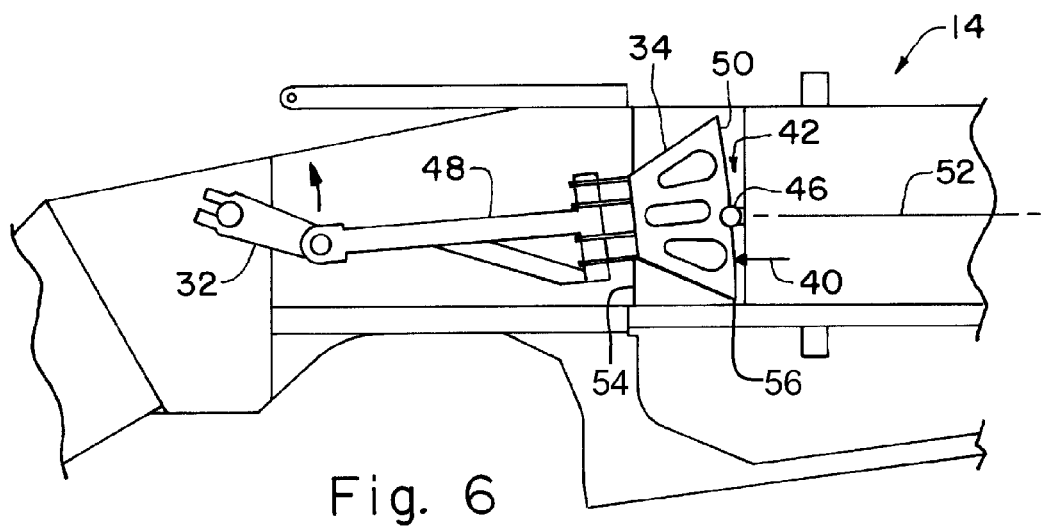
FIG. 6 is a schematical side view of the plunger of FIGS. 1 and 3-5 in a nearly fully extended position.
Figure 7:
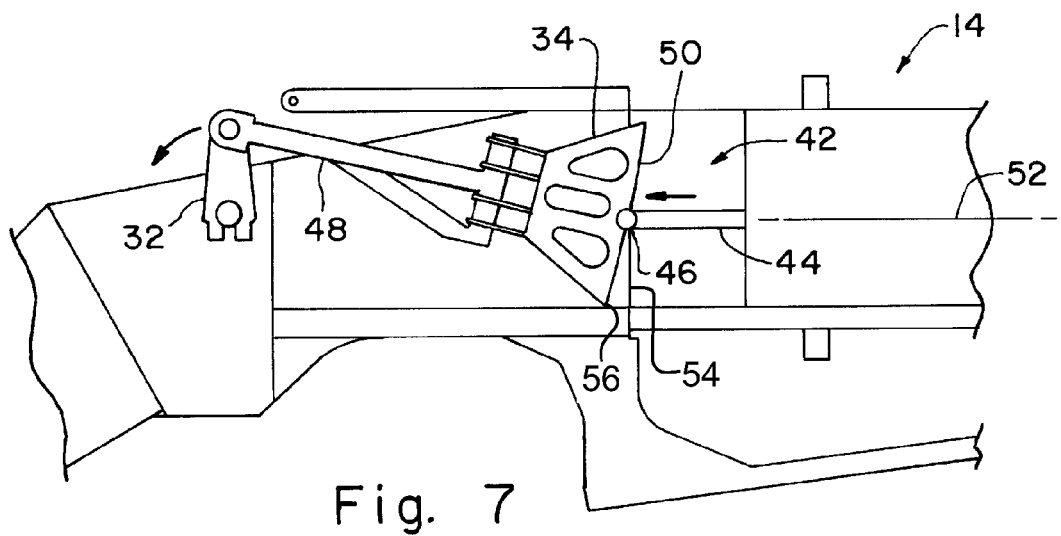
FIG. 7 is a schematical side view of the plunger of FIGS. 1 and 3-6 in a retracting position as the plunger is being repositioned for a new flake of crop material to enter into the pressing channel.

As shown in FIG. 4, plunger 34 is fully retracted and is at the beginning of its stroke into pressing channel 42. In FIG. 5, plunger 34 has moved along channels 42 and 44 with the line of force 40 being located proximal to the bottom of face 50 as plunger 34 is pressing material held in pressing channel 42. As shown in FIG. 6, plunger 34 is approaching the end of its stroke in pressing channel 42 and just as rotary arm 32 and linking element 48 align, face 50 of plunger 34 performs a rocking motion across the crop material with line of force 40 moving from the bottom half of plunger face 50 to the upper half of plunger face 50 and specifically crossing longitudinal axis 52. In FIG. 7, plunger 34 is retracting in pressing channel 42 with face 50 now being tilted in the direction counter to that shown in FIG. 5. Face 50 may be curved only in the direction shown causing the line of force 40 to be substantially straight along the surface of face 50. Plunger 34 partially rotates, tilts, or pivots about pivot point 46 as it interacts with guiding channel 44 during cycling.

The positioning of plunger 34 is entirely determined by its two pivoting connections as it moves. Plunger 34 is directly pivotally connected to crank arm 32 and is pivotally slidingly coupled to guiding channel 44. The rotation of rotary arm 32 provides both translational and a rolling type movement as the stroke ends of plunger 32.

The movement of plunger 34, as it completes a cycle, has portions apart from pivot point 46 that move in a figure-eight motion. For example, corner 56 of plunger 34 will move in a figure-eight motion as can be understood by reviewing FIGS. 4-7 and understanding the interaction of rotary arm 32 and plunger 34. The cross over point of the figure-eight movement of corner 56 is located to coincide proximately or even substantially with the location of knife 54. This advantageously provides for optimal cutting of the crop material.

The present invention has distinct advantages over the prior art in that the line of force 40 loading on the plunger face moves across face 50. Another advantage is that fewer bearings are needed for the present invention. The present invention also allows for a shorter overall system length since the longitudinal stability of a large plunger 24 is unnecessary.

Having described the preferred embodiment, it will become apparent that various modifications can be made without departing from the scope of the invention as defined in the accompanying claims.

The invention claimed is:

1. An agricultural baling machine, comprising:
  a structural element having a crop receiving channel defining a longitudinal axis therein;
  a rotating element;
  a plunger having a pivot point, said pivot point located at a center of a front face of the plunger; and
  a linking element having one end pivotally attached to the rotating element and an opposing end rigidly attached to the plunger, said plunger having a face configured to have a line of loading, said line of loading being generally normal to said longitudinal axis, said face of said plunger performs a rocking motion to cause said line of loading shifting across said face as said linking element drives said plunger generally in a first direction and a second direction opposite said first direction, an entire travel of said pivot point in said first and second directions corresponding to said longitudinal axis.

2. The agricultural baling machine of claim 1, wherein said face has a curved shape.

3. The agricultural baling machine of claim 2, wherein said curved shape is convex.

4. The agricultural baling machine of claim 3, wherein said line of loading is substantially straight.

5. The agricultural baling machine of claim 1, wherein said plunger has a rotating movement while the plunger is moving along said first and second directions.

6. The agricultural baling machine of claim 5, wherein said plunger has a pivoting axis about which said plunger tilts as said plunger moves in said first and second directions.

7. The agricultural baling machine of claim 6, wherein said line of loading is generally parallel with said pivoting axis.

8. The agricultural baling machine of claim 7, wherein said plunger is configured so that said line of loading is one of at and above said pivoting axis for substantially the entire travel of said plunger in said first direction and said line of loading is one of at and below said pivoting axis for substantially the entire travel of said plunger in said second direction.

9. The agricultural baling machine of claim 8, wherein said line of loading is part of a tangential plane of said face that becomes normal to said longitudinal axis when said plunger reaches an endpoint of travel along said longitudinal axis.

10. An agricultural baling machine, comprising:
  a rotating element;
  a plunger having a pivoting point, said pivoting point located at a center of a front face of the plunger;
  a guide channel in which said pivoting point travels, said guide channel defining a longitudinal axis; and
  a linking element having one end pivotally attached to the rotating element and an opposing end rigidly attached to the plunger, said plunger having a face configured to have a line of loading, said line of loading being generally normal to said longitudinal axis, said face of said plunger performs a rocking motion to cause said line of loading shifting across said face as said linking element drives said plunger generally in a first direction and a second direction opposite said first direction, an entire travel of said pivoting point in said first and second directions corresponding to said longitudinal axis.

11. The agricultural baling machine of claim 10, wherein said face has a curved shape.

12. The agricultural baling machine of claim 11, wherein said curved shape is convex.

13. The agricultural baling machine of claim 12, wherein said line of loading is substantially straight.

14. The agricultural baling machine of claim 10, wherein said plunger has a rotating movement while the plunger is moving along said first and second directions.

15. The agricultural baling machine of claim 14, wherein said pivoting point defines a pivoting axis about which said plunger tilts as said plunger moves in said first and second directions.

16. The agricultural baling machine of claim 15, wherein said line of loading is generally parallel with said pivoting axis.

17. The agricultural baling machine of claim 16, wherein said plunger is configured so that said line of loading is one of at and above said pivoting axis for substantially the entire travel of said plunger in said first direction and said line of loading is one of at and below said pivoting axis for substantially the entire travel of said plunger in said second direction.

18. The agricultural baling machine of claim 17, wherein said line of loading crosses said longitudinal axis when said plunger reaches an endpoint of travel along said longitudinal axis.

* * * * *